US011785182B2

(12) United States Patent  
Oaks

(10) Patent No.: US 11,785,182 B2  
(45) Date of Patent: Oct. 10, 2023

(54) SYSTEM FOR TRANSMITTING DATA FROM AN EVENT

(71) Applicant: APOLLO STREAMS INC., Highland, UT (US)

(72) Inventor: Brian Adam Oaks, Highland, UT (US)

(73) Assignee: APOLLO STREAMS INC., Highland, UT (US)

( * ) Notice: Subject to any disclaimer, the term of this patent is extended or adjusted under 35 U.S.C. 154(b) by 231 days.

(21) Appl. No.: 17/308,571

(22) Filed: May 5, 2021

(65) Prior Publication Data

US 2021/0360202 A1 Nov. 18, 2021

Related U.S. Application Data

(60) Provisional application No. 63/026,464, filed on May 18, 2020.

(51) Int. Cl.
| | | |
|---|---|---|
| *H04N 7/18* | (2006.01) | |
| *H04N 23/54* | (2023.01) | |
| *H04N 23/90* | (2023.01) | |
| *H04N 23/661* | (2023.01) | |

(52) U.S. Cl.
CPC ............ *H04N 7/181* (2013.01); *H04N 23/54* (2023.01); *H04N 23/661* (2023.01); *H04N 23/90* (2023.01)

(58) Field of Classification Search
CPC ........ H04N 23/54; H04N 23/90; H04N 7/181; H04N 21/21805; H04N 21/4223; H04N 23/661; H04N 21/2187; H04N 21/2743; H04N 5/268; G03B 17/561

See application file for complete search history.

(56) References Cited

U.S. PATENT DOCUMENTS

| | | | |
|---|---|---|---|
| 6,056,450 A * | 5/2000 | Walling | F16M 11/42 396/428 |
| 6,663,298 B2 * | 12/2003 | Haney | G03B 17/00 396/419 |
| 8,184,169 B2 | 5/2012 | Ortiz | |
| 8,269,884 B2 * | 9/2012 | Overstreet | F16M 11/041 396/428 |
| 9,417,508 B2 | 8/2016 | Yang | |
| 9,568,143 B2 * | 2/2017 | Ben Meir | F16M 11/34 |
| 10,663,839 B1 * | 5/2020 | O'Brien | F16M 11/16 |
| 10,742,864 B2 | 8/2020 | Khazanov et al. | |
| 11,221,544 B1 * | 1/2022 | York | F16M 11/24 |
| 11,509,817 B2 * | 11/2022 | Gove | G06T 1/0007 |
| 2008/0129825 A1 * | 6/2008 | DeAngelis | H04N 23/695 348/E7.086 |
| 2009/0014605 A1 * | 1/2009 | Kehl | F16M 11/34 248/161 |
| 2009/0057503 A1 * | 3/2009 | Hou | F16M 11/10 248/165 |
| 2011/0285863 A1 * | 11/2011 | Burke | H04N 21/6125 348/207.1 |
| 2012/0039579 A1 * | 2/2012 | Esposito | H04N 9/7921 386/E5.069 |

(Continued)

*Primary Examiner* — Boubacar Abdou Tchoussou

(74) *Attorney, Agent, or Firm* — Oliff PLC

(57) ABSTRACT

A camera mounting system and a system for streaming data. The camera mounting system includes a tripod with at least two mounts for mounting devices. A device, using an application, may acquire image data from at least one camera and send the image data to a recipient device via a wireless network.

13 Claims, 21 Drawing Sheets

(56) References Cited

U.S. PATENT DOCUMENTS

| | | | |
|---|---|---|---|
| 2013/0242105 A1* | 9/2013 | Boyle | H04N 7/181 |
| | | | 348/157 |
| 2016/0127641 A1* | 5/2016 | Gove | H04N 23/64 |
| | | | 348/143 |
| 2017/0019588 A1* | 1/2017 | Gordon | F16M 11/26 |
| 2018/0106418 A1* | 4/2018 | Anglin | F16M 11/18 |
| 2021/0321036 A1* | 10/2021 | Iwabuchi | H04N 23/695 |
| 2022/0230727 A1* | 7/2022 | Attard | G16H 20/30 |

* cited by examiner

SYSTEM FOR TRANSMITTING DATA FROM AN EVENT

BACKGROUND

The present disclosure relates to hardware and computer-implemented procedures that may be used to "stream" events and activities in real time.

Streaming live events, for example, using the internet, is a desirable way for audio and video data to be taken from an event and dispersed to at least one or more remote end-users at a location away from the event.

Streaming involves transmitting or receiving video and/or audio data over a network as a steady, continuous flow, whereby playback of the data can occur for a remote end-user even while additional data is still being received.

Real-time streaming is particularly desirable for sporting events, where remote end-users are interested in watching developments of the sporting event in as close to real time as possible.

U.S. Pat. No. 8,184,169 discloses a system whereby remote end-users can retrieve multiple video perspectives captured by cameras and mobile devices within an entertainment venue. However, the cameras and mobile devices must be controlled by individual users, or otherwise must be static in nature.

U.S. Pat. No. 10,742,864 discloses a system for controlling multiple cameras that reduce the need for manual management and control of cameras and cameramen by using motion detection of a ball or the like. However, this process is expensive, requires significant effort to broadcast an appropriate screen, and is prone to error.

U.S. Pat. No. 9,417,508 describes a foldable tripod that can be rapidly assembled. Further, a basic requirement of known tripod configurations is to keep the camera within the reach of the user that is using the video, and the camera is directly controlled by that person.

While such tripod configurations allow for a single user to control a single camera, known tripod configurations lack the capability to hold both a camera device and a second device that allows for a user to control received data from a plurality of cameras. That is, a person operating a camera using a tripod cannot control multiple cameras from multiple locations simultaneously while being comfortably seated.

Further, while a configuration of a plurality of cameras disposed at locations around an event has been contemplated, such a configuration, as discussed above, requires expensive resources and a crew of people to appropriately record and stream events.

SUMMARY

Contemplated herein is a system that addresses some or all of the deficiencies described above. For example, a tripod according to some aspects of this disclosure has a configuration where a single user can control multiple cameras from a comfortable, seated position. The tripod may have a first mount to hold a first device having a camera. The mount may be attached to hardware that allows for the camera to be moved along any of an x, y and z axis, and rotated up to 360° along a rotation axis. The tripod may have a second mount to hold a second device, such as a tablet, which can be viewed by the tripod operator (e.g., a user of the tripod and the system contemplated herein) from a seated otherwise comfortable position.

Further, the system as described herein may advantageously allow for a single tripod operator to retrieve and control image data from a plurality of cameras, and select one of a plurality of camera views to be streamed to an end-user without having to manually operate each individual camera.

One aspect of this disclosure is a camera mounting system having a tripod. The tripod has a base portion, an extendible and collapsible plurality of legs configured to extend downward from the base portion, and a ball joint connected to the extendible and collapsible neck. The tripod further includes a first mount connected to the ball joint and configured to hold a first device, a second mount anchored to at least two of the plurality of legs and configured to hold a second device different from the first device, and a handle connected to a connector portion at a lower portion of the extendible and collapsible neck, the handle configured to move along first and second axes and to rotate along a 360° plane. The extendible and collapsible neck is configured to move in response to a movement of the handle.

Another aspect of this disclosure is a system for streaming data. The system includes a processor that is configured to connect to a wireless network, retrieve first data from one of a plurality of cameras disposed at a first predetermined position at an event location, the one of the plurality of cameras being connected to the wireless network, and retrieve second data from another of the plurality of cameras disposed at a second predetermined position at the event location, the another of the plurality of cameras being connected to the wireless network. The processor further can transmit the first data and the second data to a display of a display device and select at least one of the first data and the second data and transmit the at least one of the first data and the second data to the wireless network for retrieval by a recipient device.

A still further aspect of this disclosure is a method for transmitting data from an event. The method includes placing a first device on a first mount disposed on the tripod device, placing a second device on a second mount disposed on a plurality of legs of the tripod device and at a position below the first device, and connecting the first device and the second device to a wireless network. The method further includes retrieving image data from a camera of the first device, transmitting the image data from the camera of the first device to the second device, and transmitting the image data from the second device to a recipient device via the wireless network.

DETAILED DESCRIPTION OF EMBODIMENTS

Figure 1:
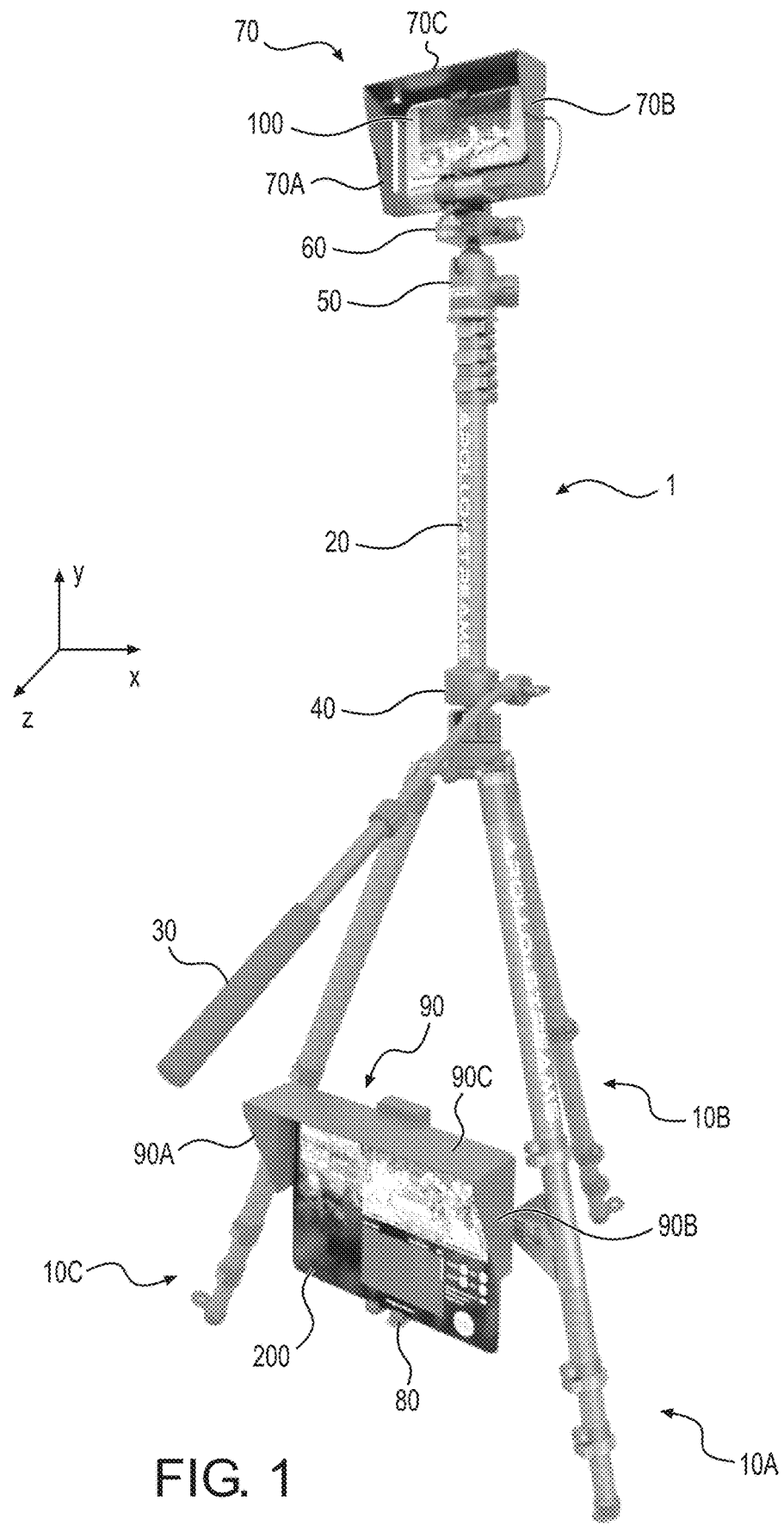
FIG. 1 is a diagram of a camera mounting system according to some embodiments.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device and method described herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, the subject matter of this application illustratively disclosed herein suitably may be practiced in the absence of any element(s) that are not specifically disclosed herein.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "has," "have," "having," "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The explicit description of the present disclosure has been presented for purposes of illustration and description, but is not intended to be exhaustive or limited to embodiments of the disclosure in the form explicitly disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated.

The following definitions are provided in order to aid those skilled in the art in understanding the detailed description.

As used herein, the term "tripod" refers to a structure with a plurality of legs that can be used to support at least one camera or other apparatus. While a tripod according to this disclosure is described as having three legs, the term is not intended to be limited to exactly three legs. Systems with two legs or four or more legs are within the scope of the term "tripod" according to this disclosure.

As used herein, the term "gimbal" refers to a mechanism that may support at least one device and can permit rotation of the device around at least one axis. A gimbal may be manually or electronically controlled, and, in a situation where the gimbal is electronically controlled, it may be controlled entirely remotely.

As used herein, the term "event" relates to any public or private undertaking. While the instant disclosure describes examples of sporting events, for example a soccer game, the term "event" should be construed to include non-sporting events, such as concerts, fairs, birthday parties, gatherings, or any undertaking where a camera can be positioned to acquire image data.

As used herein, the terms "app" or "application" (used interchangeably) relate to a computer program or software that is designed to run on at least one of a mobile device, tablet, or computer.

FIG. 1 is a rendering of a camera mounting system according to some embodiments. The system includes a tripod 1 having a plurality of legs 10A, 10B and 10C. When in an expanded position (e.g., when in use), the plurality of legs extend downward from a base portion or central joint 40.

In some embodiments, the legs 10A, 10B and 10C are evenly spaced from each other, each leg being disposed 120° for the others of the legs around the circumference of the central joint 40. Such a configuration may provide for stability of the tripod 1. When in the extended configuration, each leg extends about 2-8 feet, or about 3-7 feet, or about 5 feet or about 55 inches from the central joint 40. Each leg 10A-10C may have at least one, but preferably two or more extension portions so as to allow for the tripod to be expanded into multiple configurations. In embodiments where the legs 10A-10C include two extension portions, the legs can be collapsed so that a first extension portion fits within a larger-diameter second extension portion, and the second extension portion fits within a larger-diameter outer portion, so that the tripod can be significantly compacted.

In some embodiments, the legs 10A, 10B and 10C are not evenly spaced from each other. For example, the legs that hold a second mount 80 (described in more detail later) may be closer to each other than to the leg not holding the second mount, so as to improve stability of the device being held within the second mount.

Figure 10:
FIG. 10 is a collapsed configuration of the camera mounting system of FIG. 1.

In some embodiments, an extendible and collapsible neck (or mast) 20 may extend, when in use, upward from the central joint 40. The neck 20 may extend a distance of about 3-5 feet, or about 4 feet, from the central joint a ball joint 50 (described later). In some embodiments, the total height of the tripod is about 5-12 feet, or about 7-10 feet, or about 9 feet when in the extended configuration. However, when in a collapsed configuration for storage or transit, as shown in FIG. 10, the entire camera mounting system may fit within a standard-sized backpack or carry-on type luggage.

Also extending from the central joint 40 is a handle 30. The handle 30 may extend outward from the joint 1-3 feet or ore, so as to allow the user of the tripod to be comfortably seated at a distance away from a first device 100 and a second device 200, discussed later, to avoid eye strain, while still allowing for complete control of the tripod.

The handle 30 is connected to the joint 40 in a manner to allow for movement of the neck 20 in x, y and z directions, the x, y and z directions corresponding to left-right, up-down, and front-back directions as shown in FIG. 1. Further, the handle may allow for rotation of the neck 20 along a rotation axis of the neck.

A ball joint 50 is affixed to the neck 20 at an upper portion of the neck. The ball joint 50 is rotatable along its rotation axis and may move in the x, y and z directions, so as to transmit movement to and allow for translation or rotation of the mount 60 affixed thereto.

The mount 60 is provided in such a manner whereby a device (hereinafter the "first device") 100 can be detachably attached thereto. In some embodiments, the first device 100 is a device with a camera and may be capable of taking one or more of video, still images, and audio recordings. In some embodiments, the first device 100 is an iPhone or other wireless telephone that has wireless internet connection capabilities. However, the first device is not so limited, and could also be a tablet, portable data assistant, or other device with wireless transmission and reception capability. The first device may have its own wireless network provided therein (e.g., a "Hotspot") or may only be capable of connecting to another wireless network using wireless technology.

Detachably attached to at least two of the legs (legs 10A and 10C in FIG. 1) is a second mount 80. The second mount 80 is configured to hold at least one device (hereinafter the "second device") 200 therein.

In some embodiments, the second device 200 is a tablet such as an iPad or other tablet device. However, the second device 200 is not so limited, and may be another electronic device such as a wireless phone, personal data assistant, or computer.

The second device 200 may have its own wireless network provided therein (e.g., a "Hotspot") or may only be capable of connecting to another wireless network using wireless technology. The second device 200 may also lack wireless communication but may be connectable to the first device 100 via a wired connection.

In some embodiments, the tripod 1 includes a shield 70 with flaps 70A and 70B and top portion 70C. The shield 70 may be configured to cover the first device 100 when mounted on the mount 60, so as to provide rain, sun, dirt, or other protection for the first device 100 during the event.

In some embodiments, the tripod 1 includes a shield 90 with flaps 90A and 90B and top portion 90C. The shield 90 may be configured to cover the second device 200 when mounted on the mount 80, so as to provide rain, sun, dirt, or other protection for the second device 200 during the event.

Figure 2A:
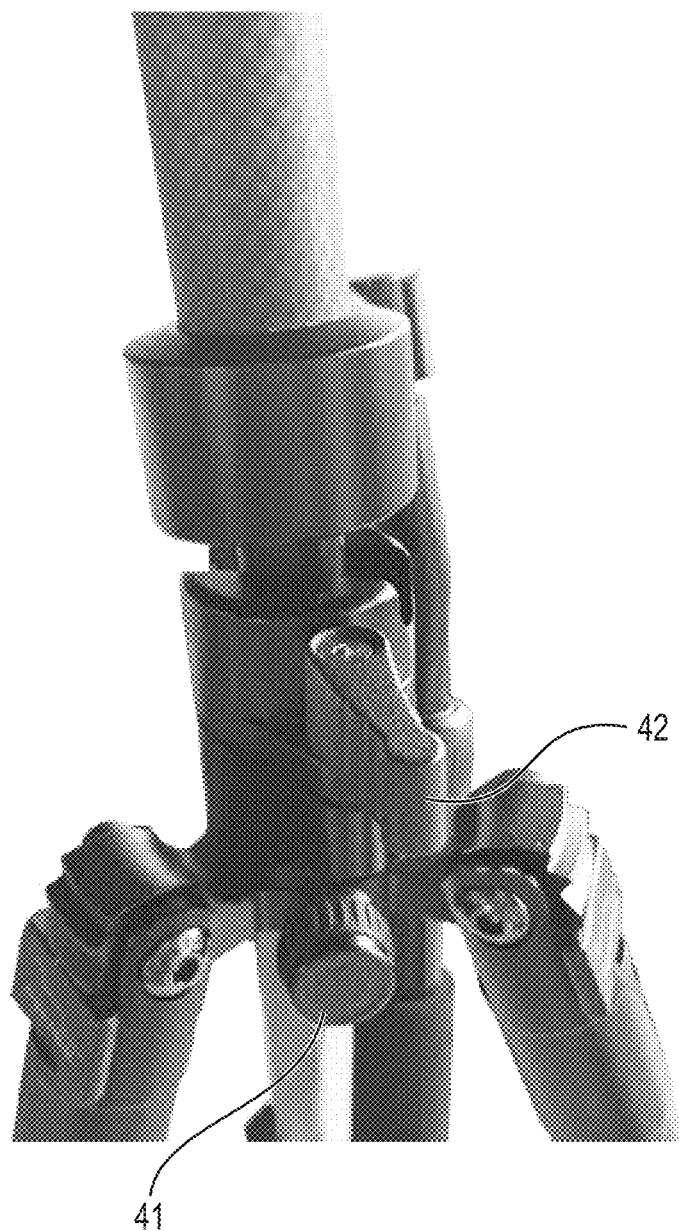
FIGS. 2A and 2B are views of a joint of a tripod of the camera mounting system of FIG. 1.
Figure 2B:
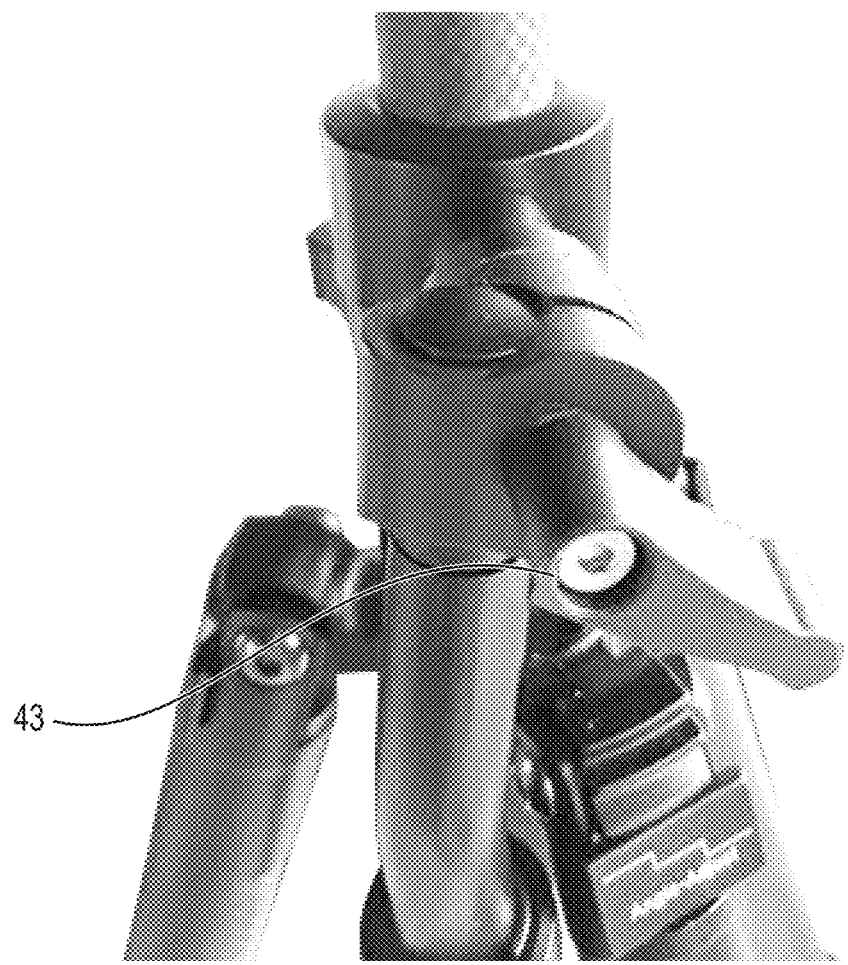

FIGS. 2A and 2B show an expanded view of the tripod joint 40 of some embodiments.

As seen in FIG. 2A, the tripod joint includes a first knob 41, which may be connected to the handle 20 in a loosened configuration whereby the handle can be rotated by 360°. The first knob 41 may be configured to restrict or at least limit the neck 20 from moving in a left-right (e.g., x) direction. Further provided is a second knob 42 which allows for control of the neck 20 in a forward or backward direction. For example, the second knob 42 may be configured to restrict or at least limit the neck 20 from moving in a front-back (e.g., z) direction.

As seen in FIG. 2B, a third knob 43 is provided to control a handle lock in any position. That is, the handle 20 may be provided with a lock that is controlled by knob 43, so that the handle can be fixed in place when desired.

Figure 3:
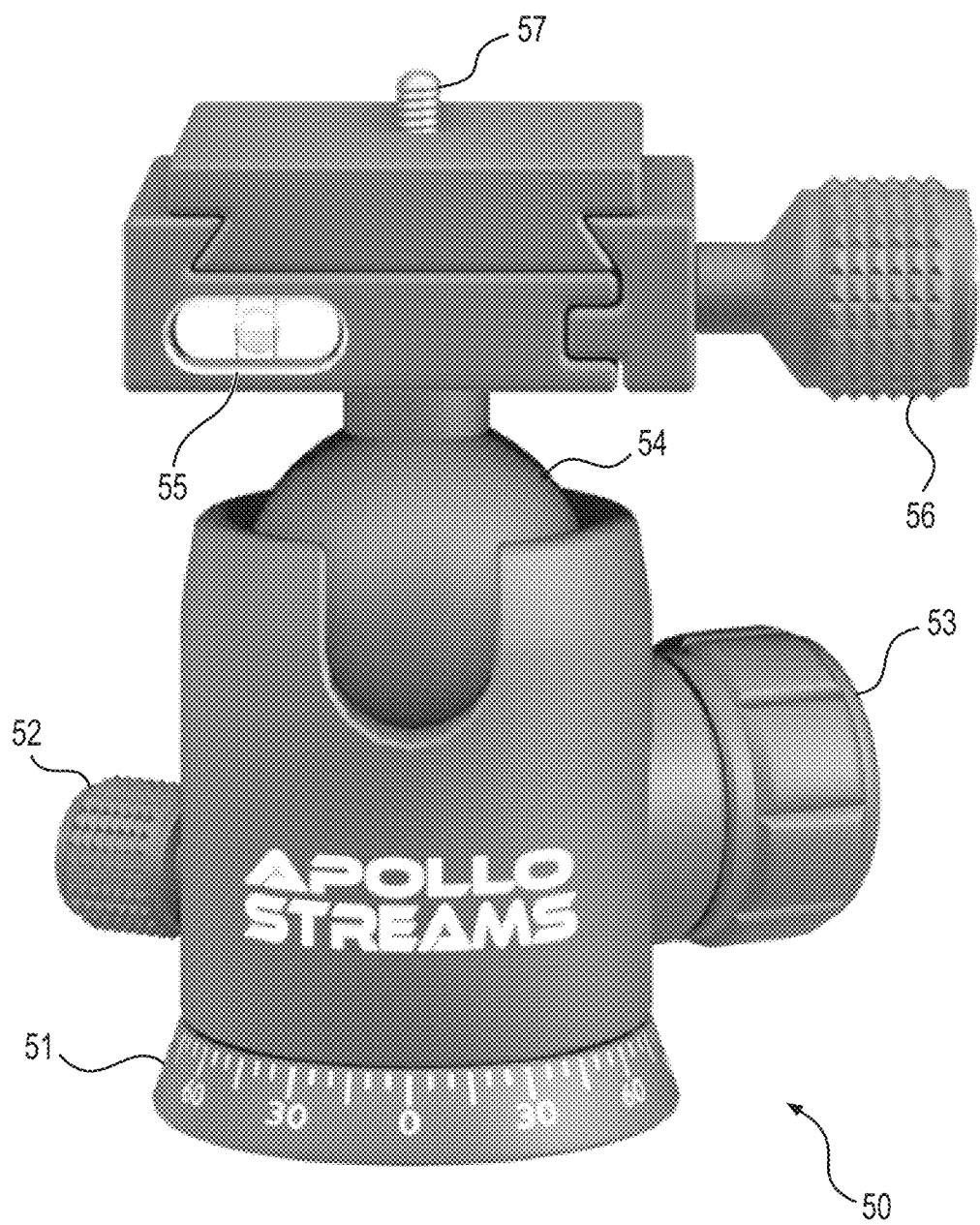
FIG. 3 is a view of another joint of the tripod of the camera mounting system of FIG. 1.

FIG. 3 shows an expanded view of the ball joint 50.

The ball joint 50 may be provided with a panoramic base 51 that includes angle markings so as to allow for a desired angle of the first device 100 attached to mount 60 attached thereto to be precisely set. The ball joint 50 may be provided with a knob 52 and a knob 53 to tighten the ball joint 50 and allow for the rotation of the ball 54 to be precisely controlled.

The ball joint 50 may also be provided with a level 55 on a ball joint mounting portion extending from a top of the ball joint 50, so as to allow for the user to ensure that the first device 100 is positioned appropriately. Extending upward from the ball joint mounting portion is a screw thread 57, which can be configured to extend into the mounting portion 60 to attach the mounting portion 60 thereto. A knob 56 can be utilized to tighten or loosen the ball joint mounting portion (the part affixed to a top of ball joint 54) to the ball joint 54 itself.

Figure 4:
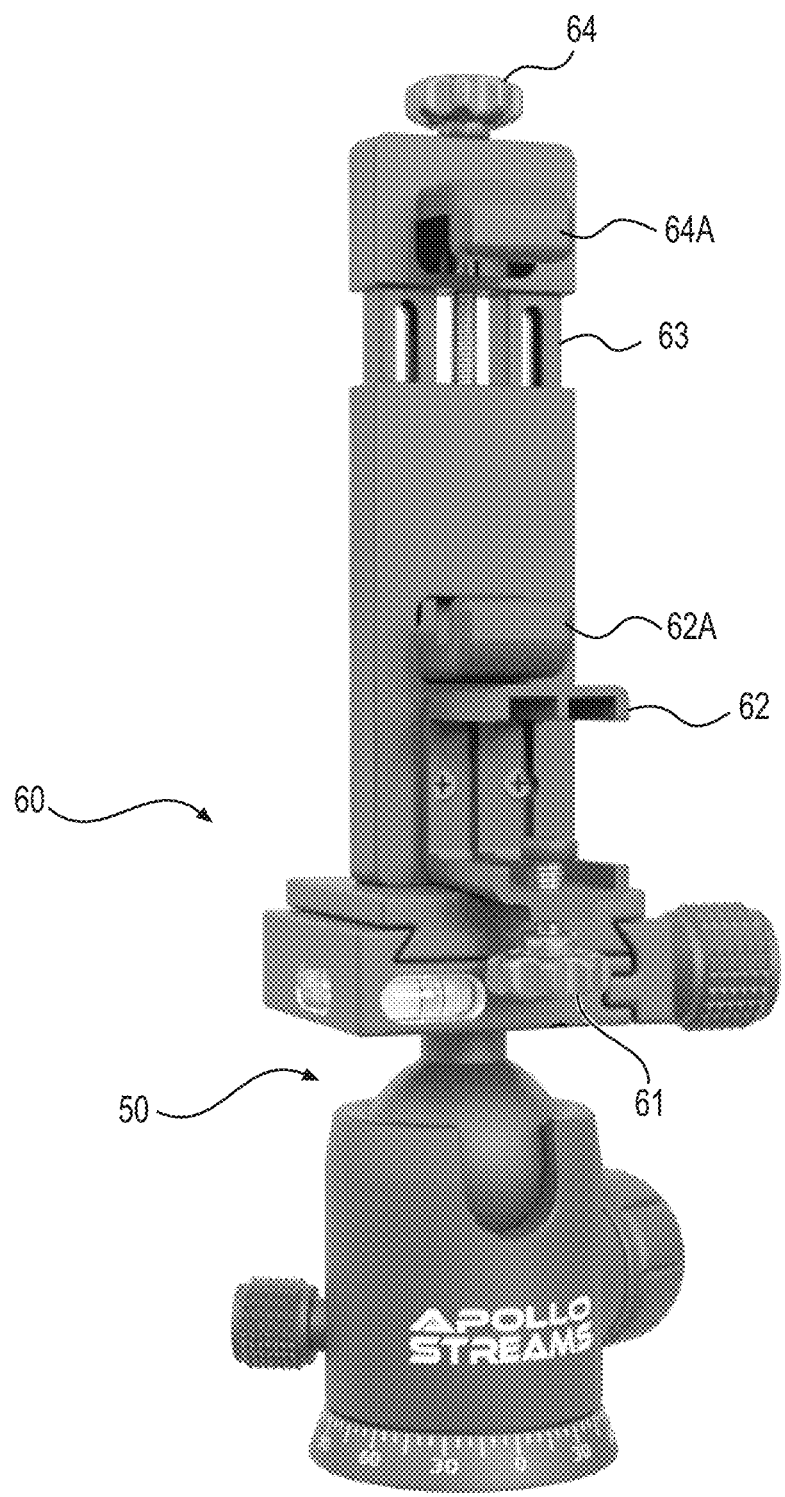
FIG. 4 is a view of the joint of FIG. 3 together with a device mount.
Figure 5:
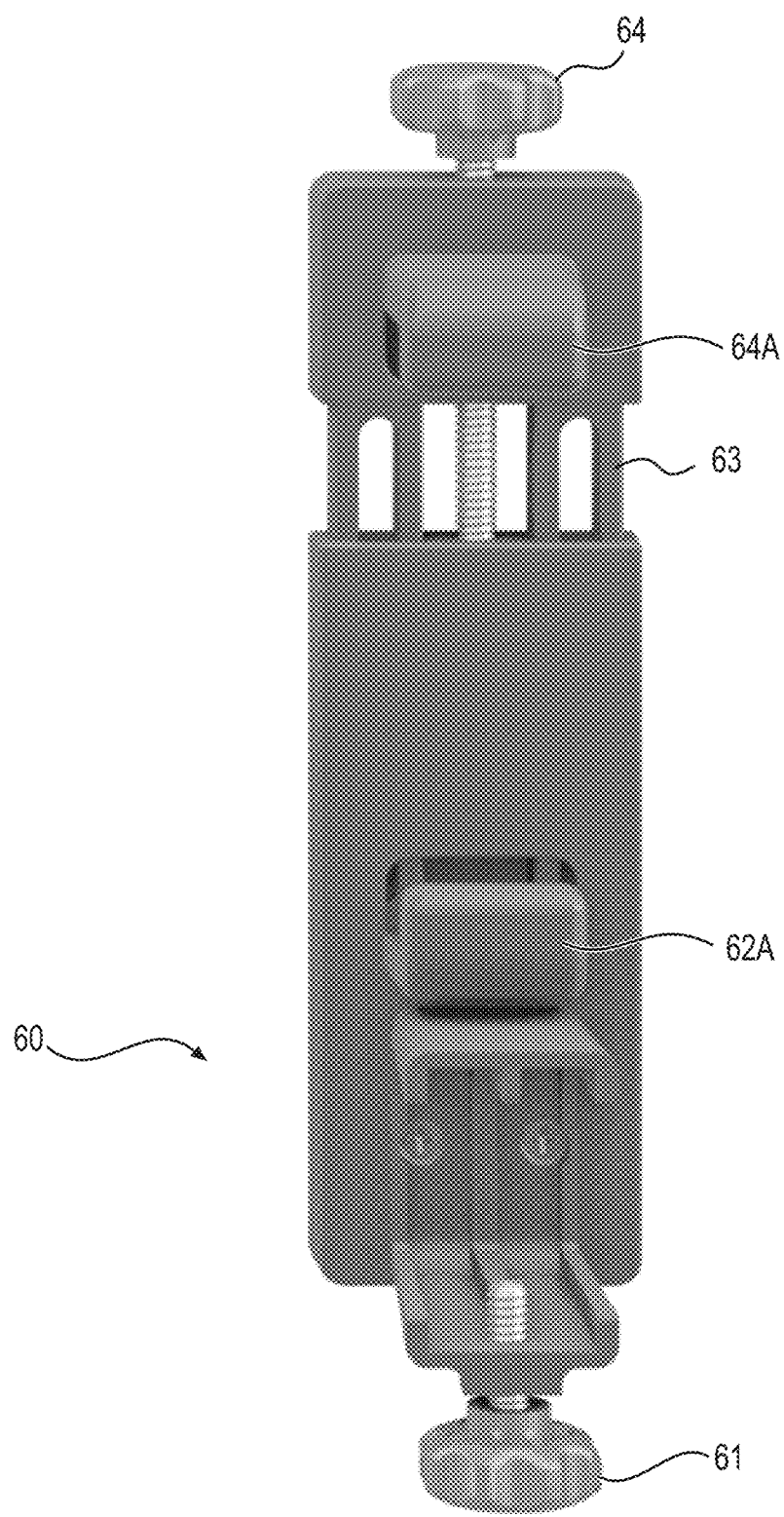
FIG. 5 is an expanded view of the device mount of FIG. 4.

FIG. 4 shows the mounting portion 60 attached to the ball joint 50. As shown in FIGS. 4 and 5, the mounting portion 60 includes a knob 61. The knob 61 may be tightened or loosened to control a sizing of portion 62, which may hold, for example, a spare battery that may be connected to the first device 100.

The mounting portion 60 includes a bottom portion 62A and a top portion 64A, at least one of which being movable by knob 64 or otherwise, so as to allow for the first device 100 to be fixed into place. Because at least one of the bottom portion 62A and top portion 64A are movable in the vertical direction, first devices 100 of variable lengths or widths can be provided therein.

In some embodiments, the mount includes movable slides 63 that slide vertically in response to the turning of the knob 64, so as to allow for tightening of the device 100 between portions 62A and 64A.

Figure 6A:
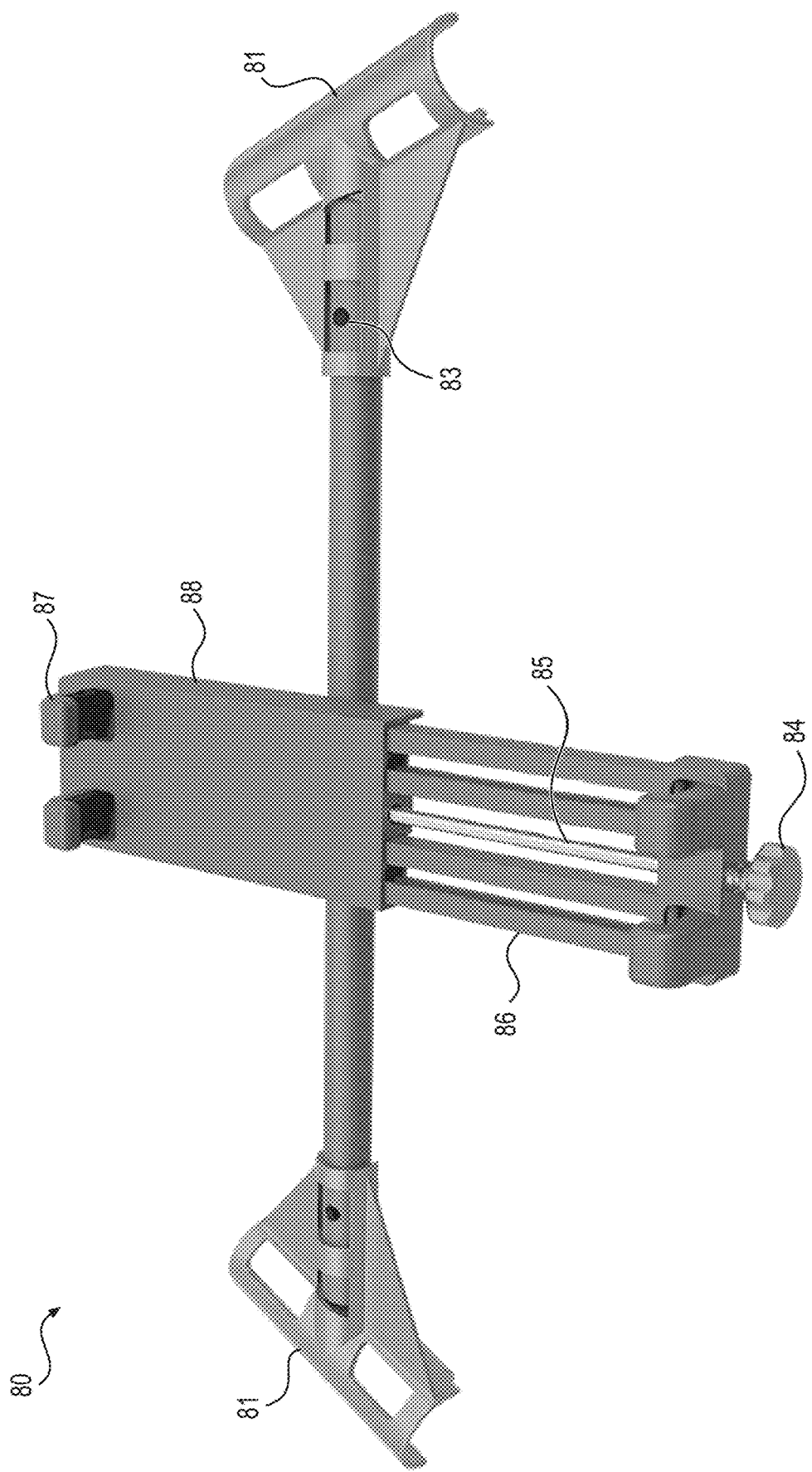
FIGS. 6A and 6B are open and closed views, respectively, of another device mount of the tripod of FIG. 1.
Figure 6B:
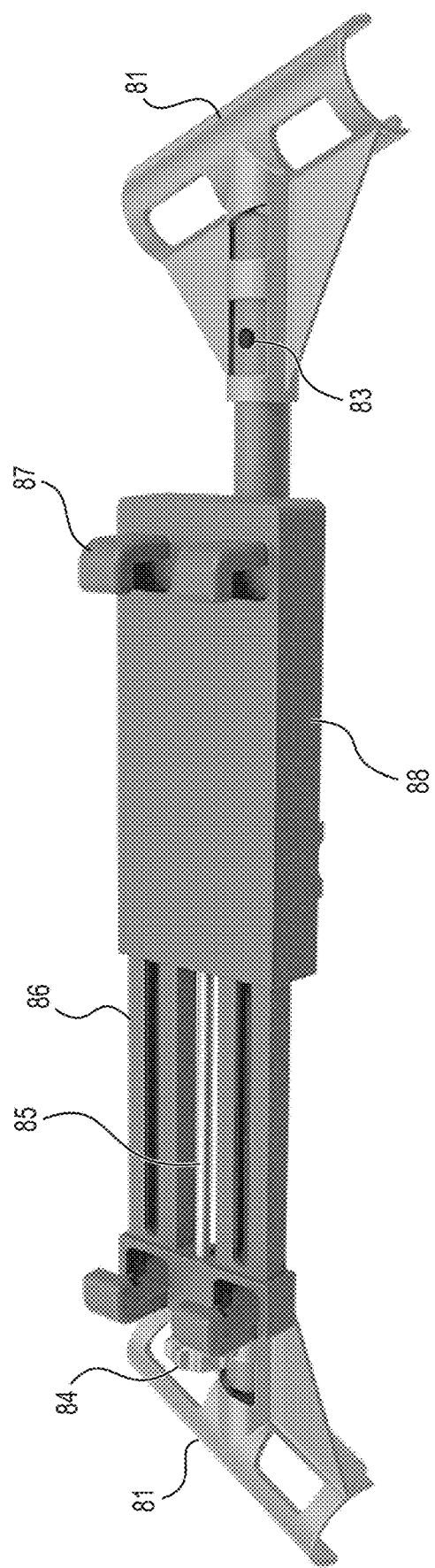

FIGS. 6A and 6B show a second mounting portion 80 that is configured to hold the second device 200. The second mounting portion 80 is provided with wings 81 that are configured to attach to the legs 10A, 10C of the tripod 1. The wings may be configured to allow for a snap-fit connection with the respective legs and may also include knob (not shown), the back of which is identified as portion 83, that can be used to allow for rotation of the mounting portion and/or device 200 itself. The wings are attached to a rod 82 which extends through the mounting device 80 in a direction substantially perpendicular to the longitudinal axis of the mounting device 80. The rod may be configured to swivel so that, as shown in the closed configuration of FIG. 6B, the rod and wings can be compactly stored when not in use.

The mounting device 80 includes a knob 84 which is connected to a threaded screw 85 and configured to allow for movement of slides 86 in a linear direction (a horizontal direction as shown in FIG. 1, though the direction depends on the mounting orientation of the mounting device 80). The second device 200 can thus be mounted to mounting device 80 by resting on mounting portion 88 between side portions 87 disposed on either side of the mounting device 80.

Because of the configuration of the mounting portion 80, second devices 200 of variable lengths or widths can be provided therein.

Figure 7:
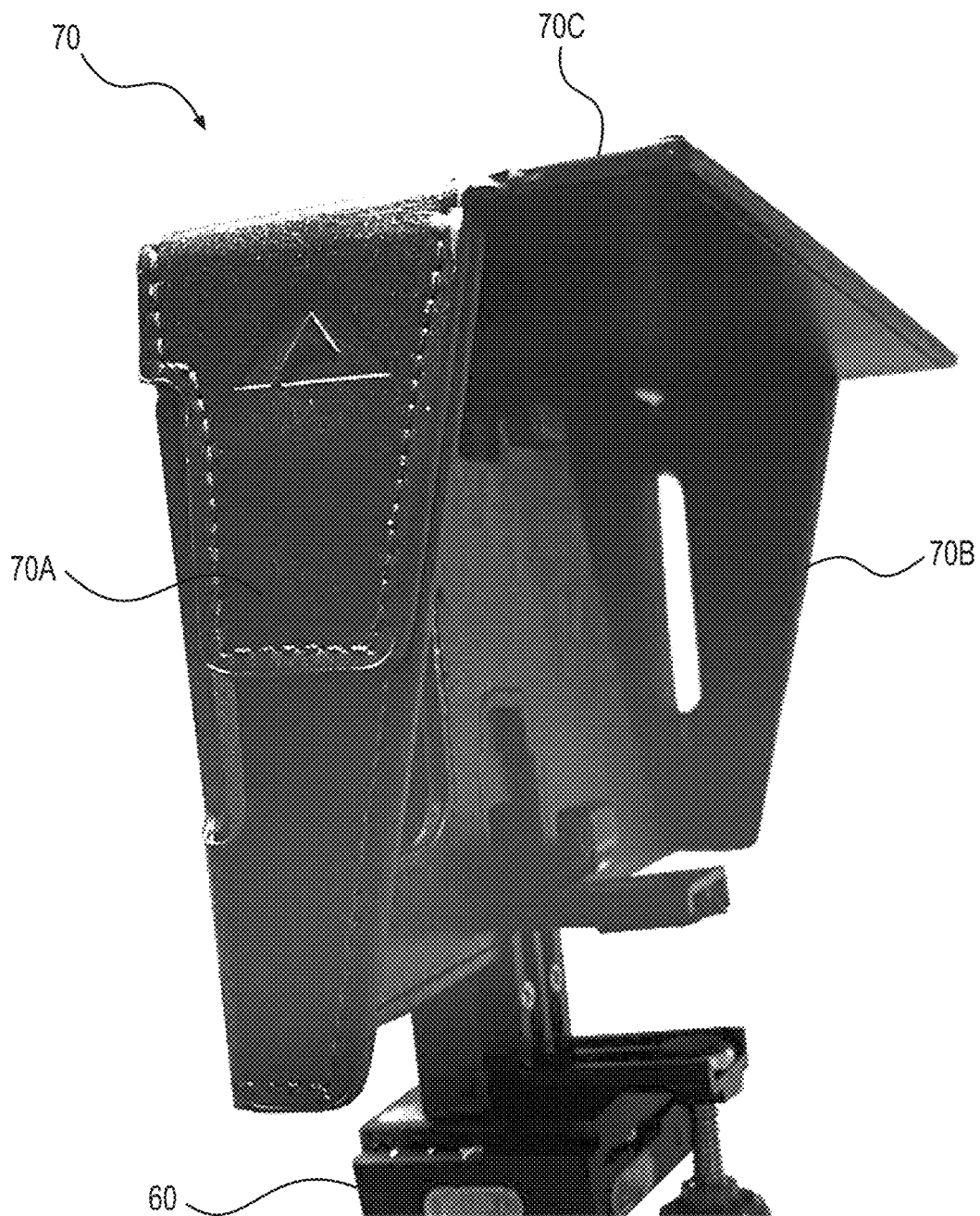
FIG. 7 is a view of a shield provided within the tripod of FIG. 1.

As shown in FIG. 7, the tripod 1 may also include a shield 70. The shield 70 may be provided with flaps 70A and 70B, as well as top portion 70C. Flaps 70A and 70B may attach to top portion 70C in any practical manner, including by magnets, Velcro, snaps, or another type of adhesive. The shield 70 may be made of metal, leather, polyester, or any material that may provide a shielding characteristic to the first device 100. The shield 70 may be disposed in a manner to surround, on at least three sides, the first device 100, so as to protect the first device from sun, heat, rain, other weather elements, dirt, and other obstructions.

Figure 8:
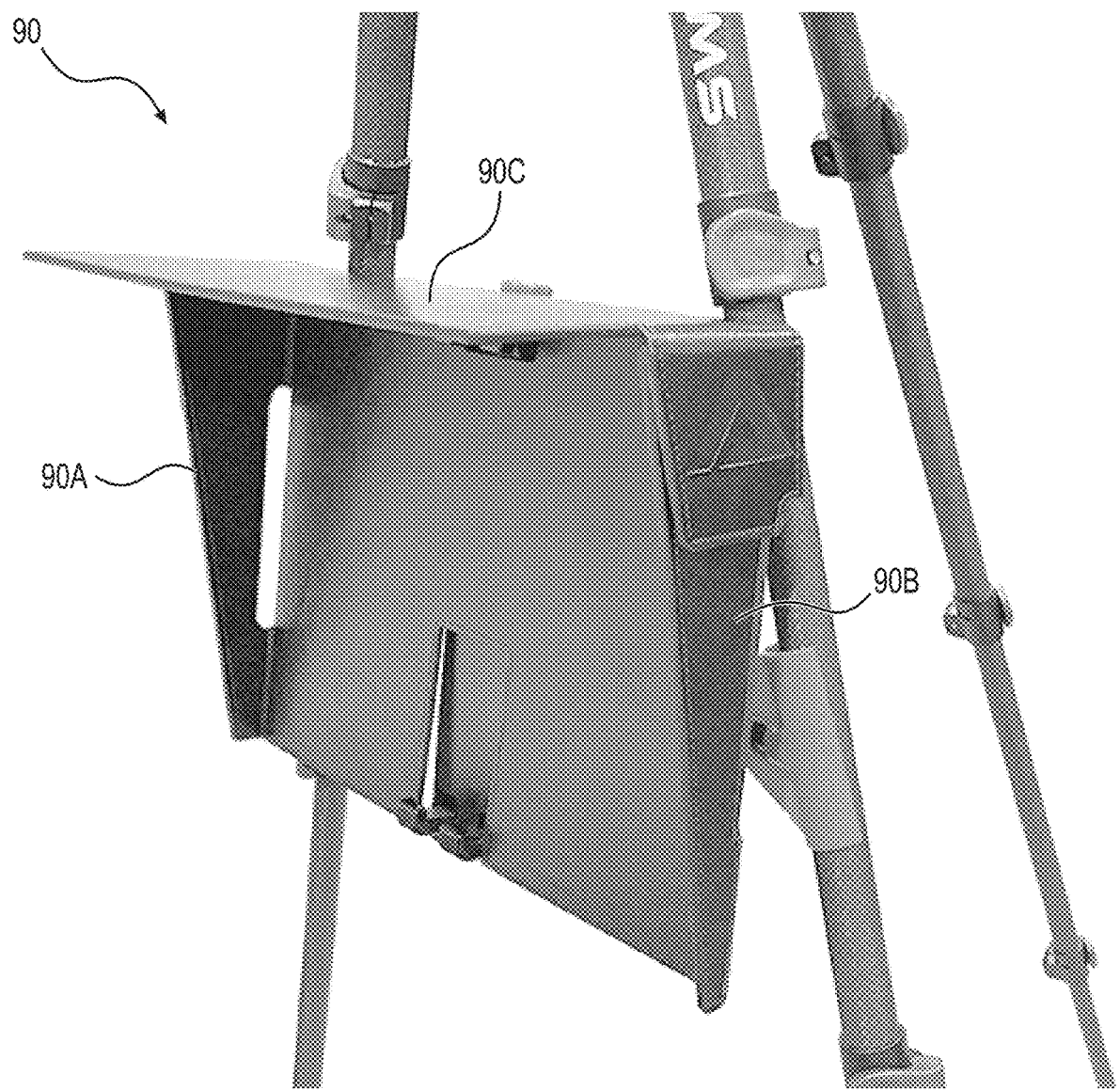
FIG. 8 is a view of another shield provided within the tripod of FIG. 1.

Similarly, as shown in FIG. 8, the tripod 1 may also include a shield 90. The shield 90 may be provided with flaps 90A and 90B, as well as top portion 90C. Flaps 90A and 90B may attach to top portion 90C in any practical manner, including by magnets, Velcro, snaps, or another type of adhesive. The shield 90 may be made of metal, leather, polyester, or any material that may provide a shielding characteristic to the second device 200. The shield 90 may be disposed in a manner to surround, on at least three sides, the first device 200, so as to protect the second device from sun, heat, rain, other weather elements, dirt, and other obstructions.

The mount 60 and/or the mount 80 may also have a battery pack provided thereon so that the devices 100 and/or 200 mounted thereon can stay powered during operation. In one embodiment, a battery powered zoom in/zoom out button is added to the tripod handle 20, the button connecting to the second device 200 via Bluetooth or other near-field communication network. When the user of the tripod activates the button, the signal can be sent from second device 200 to an appropriate camera (e.g., camera of first device 100, or another camera) instructing the camera to zoom in or out. Such a configuration and location of the button may improve processing efficiency and allow for zooming in and out while the user remains focused on the event. This signal may be a same signal that is sent from the processor when the user selects the zoom feature directly on the display of the second device 200, discussed in more detail later.

The shield 90 may have a length and width greater than the shield 70.

Within or near the shield 70 and/or the shield 90 may be a storage location to store a portable battery for the first or the second device, respectively.

Figure 9:
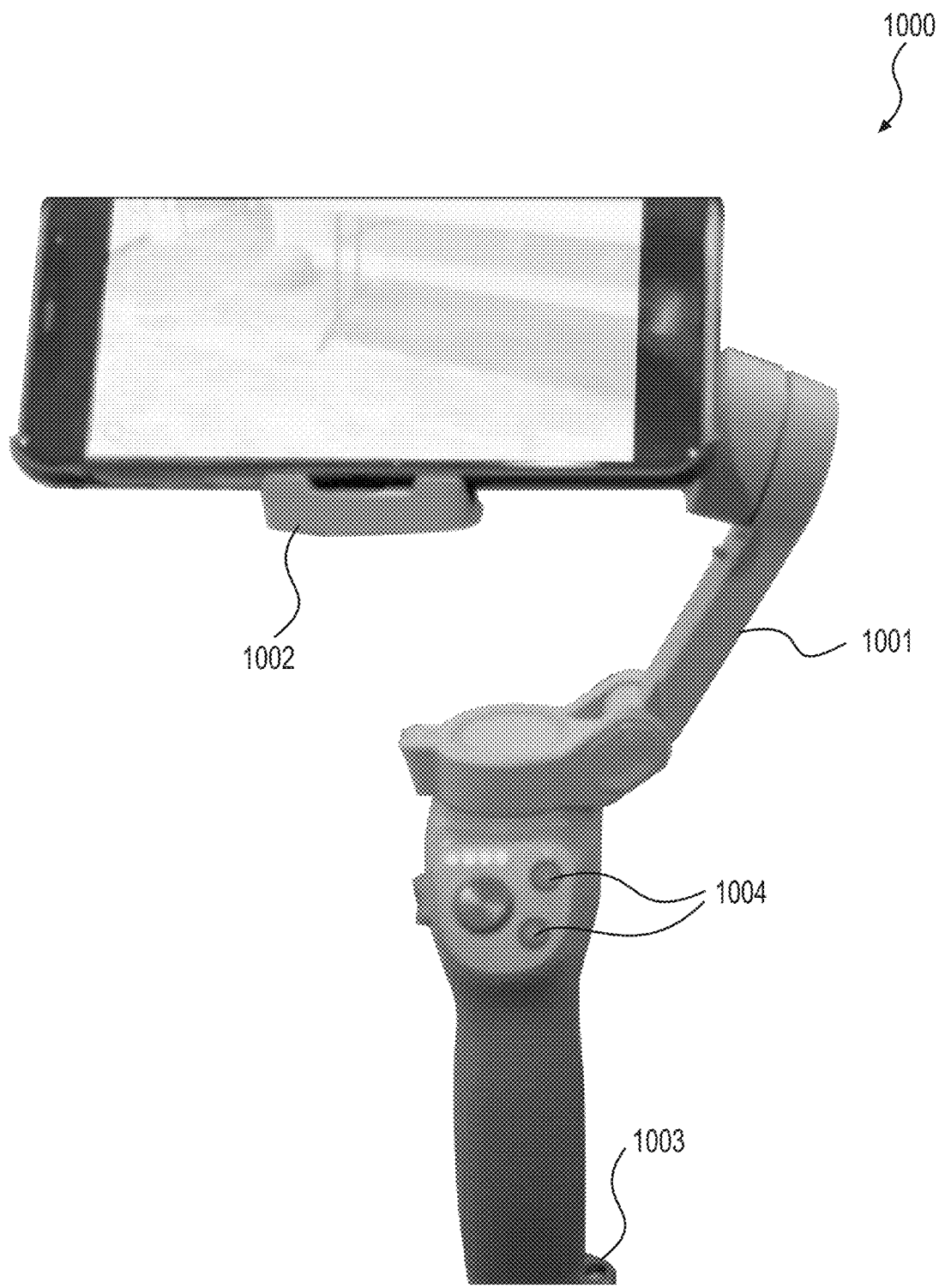
FIG. 9 is a view of a gimbal optionally provided within the camera mounting system according to some embodiments.

In some embodiments, either in addition to or instead of the mounting portion 60, a gimbal may be provided. As shown in FIG. 9, the gimbal 1000 may be attached directly to the first device and may allow for rotation of the first device. The gimbal may be controlled manually (e.g., by the handle 30) similarly to the neck 20, or may be controlled by remote control either using buttons 1004 disposed on the gimbal, or an external remote control that is provided to control the rotation of the gimbal. The gimbal may extend directly from the neck 20 by attaching to the neck with piece 1001, and may include an attachment portion 1002 provided to connect with the first device 100. The first device 100 may be affixed to the gimbal using the dock 1003.

The gimbal may thus allow for improvements in controllability of the camera of the first device, whereby the user need not be positioned at the location of the gimbal in order to control the device, and whereby the gimbal can more precisely control rotation and movement of the camera of the device 100.

FIG. 10 shows a collapsed configuration of the tripod 1. Legs 10A-10C are disposed in a relatively compact configuration to allow for ease of transportation.

In some embodiments, the camera mounting system may be used concurrently with a system for streaming data, the system for streaming data utilizing at least one of the first device 100 and the second device 200. In other embodiments, the system for streaming data may be utilized without the camera mounting system.

Figure 11A:
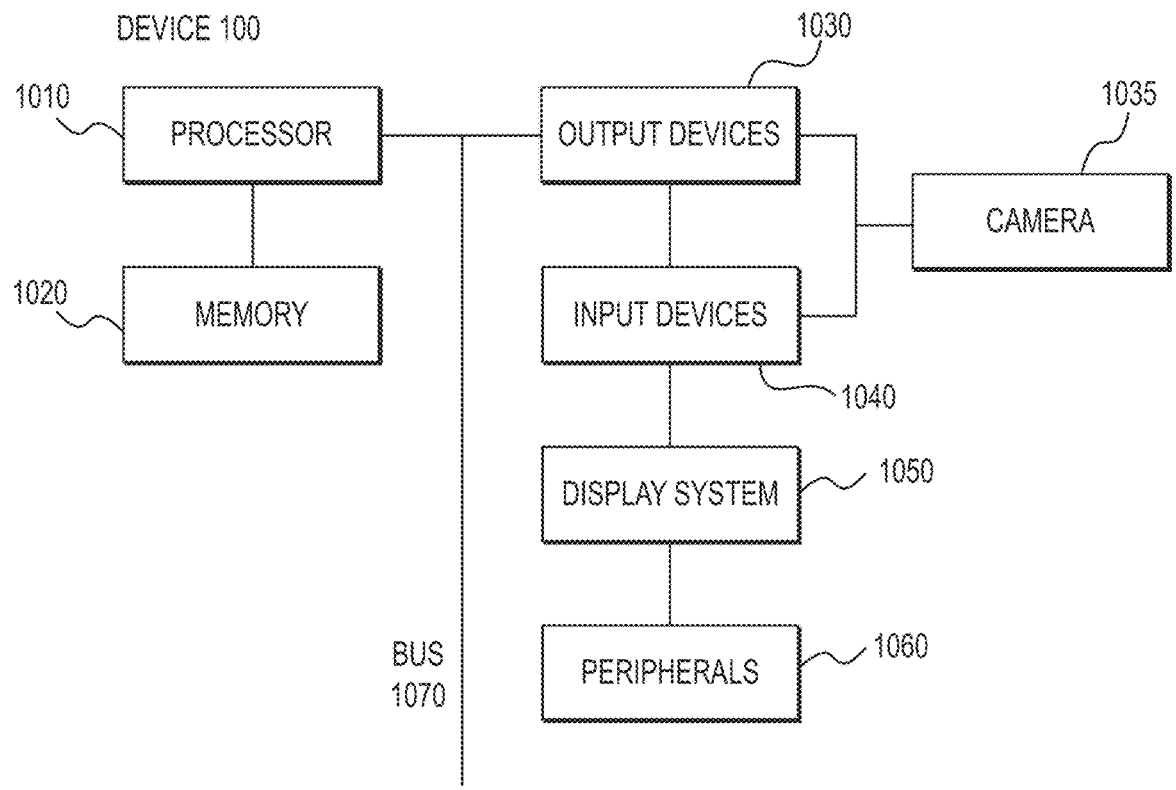
FIGS. 11A and 11B are processing diagrams of at least one processor according to some embodiments.
Figure 11B:
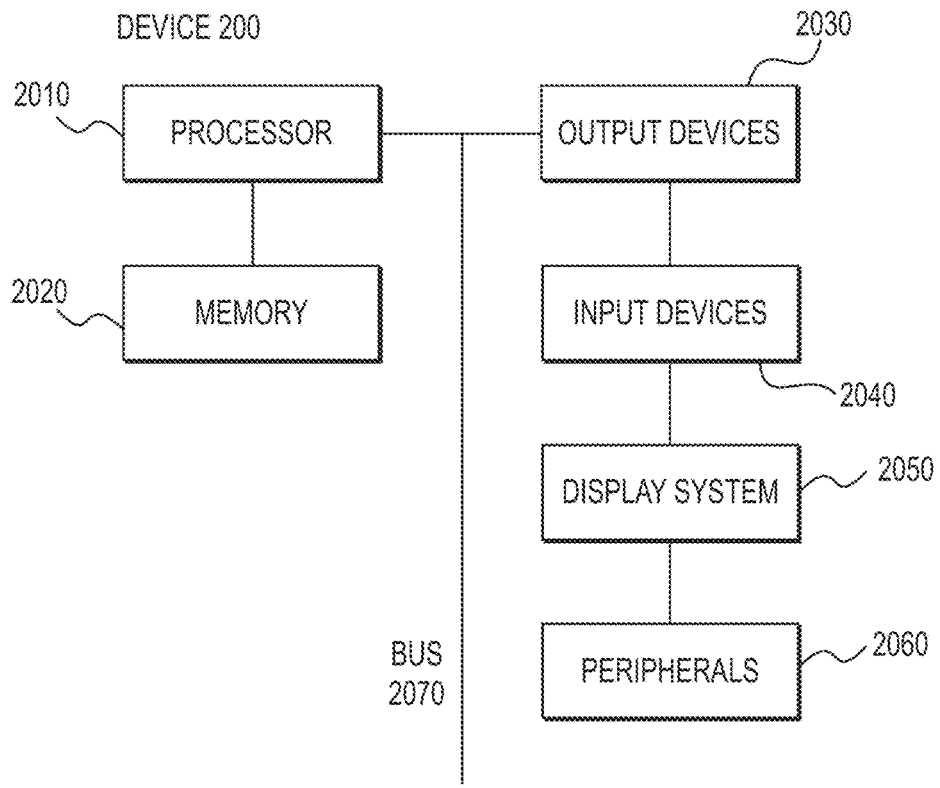

FIGS. 11A and 11B show a processing configuration including various components that may be implemented into the first device 100 and the second device 200, respectively, in various embodiments.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

Referring to FIG. 11A, the first device 100 may be a computing device having an image acquisition component (for example, a camera) provided therein. The first device 100 may be, for example, a portable phone, tablet, or laptop computer. In some embodiments, the first device 100 is a portable phone, such as an iPhone. The first device 100 may be provided with one or more processors 1010 connected to a memory 1020. The one or more processors may be, for example, a CPU or circuitry and may be able to perform programming consistent with the algorithms defined later. That is, the one or more processors are configured to execute instructions and perform one or more tasks discussed herein. The one or more processors are in communication with the memory 1020 and one or more of the other components listed FIG. 11A. The one or more processors may be configured to control, for example, input and output from the camera 1035 and/or any of the other output devices 1030, input devices 1040, and peripherals 1060. Inputs devices may include, for example, a touch screen, a keyboard, a mouse, or other external controller. The output devices 1030 may include speakers, printers, network interfaces, and output monitors. The one or more processors 1010 are also configured to communicate with the display system 1050 or an appropriate output device 1030 so as to display desired information on, for example, a display screen. The components may all be connected via a data bus 1070.

Referring to FIG. 11B, the second device 200 may be a computing device having an image acquisition component (for example, a camera) provided therein. The second device 200 may be, for example, a portable phone, tablet, or laptop computer. In some embodiments, the second device 200 is a portable tablet, such as an iPad. The second device 200 may be provided with one or more processors 2010 connected to a memory 2020. The one or more processors may be, for example, a CPU or circuitry and may be able to perform programming consistent with the algorithms defined later. That is, the one or more processors are configured to execute instructions and perform one or more tasks discussed herein. The one or more processors are in communication with the memory 2020 and one or more of the other components listed FIG. 11B. The one or more processors 2010 may be configured to control, for example, input and output any of the other output devices 2030, input devices 2040, and peripherals 2060. Inputs devices may include, for example, a touch screen, a camera, a keyboard, a mouse, or other external controller. The output devices 2030 may include speakers, a camera, a printer, network interfaces, and output monitors. The one or more processors 2010 are also configured to communicate with the display system 2050 or an appropriate output device 2030 so as to display desired information on, for example, a display screen. The components may all be connected via a data bus 2070.

Figure 12:
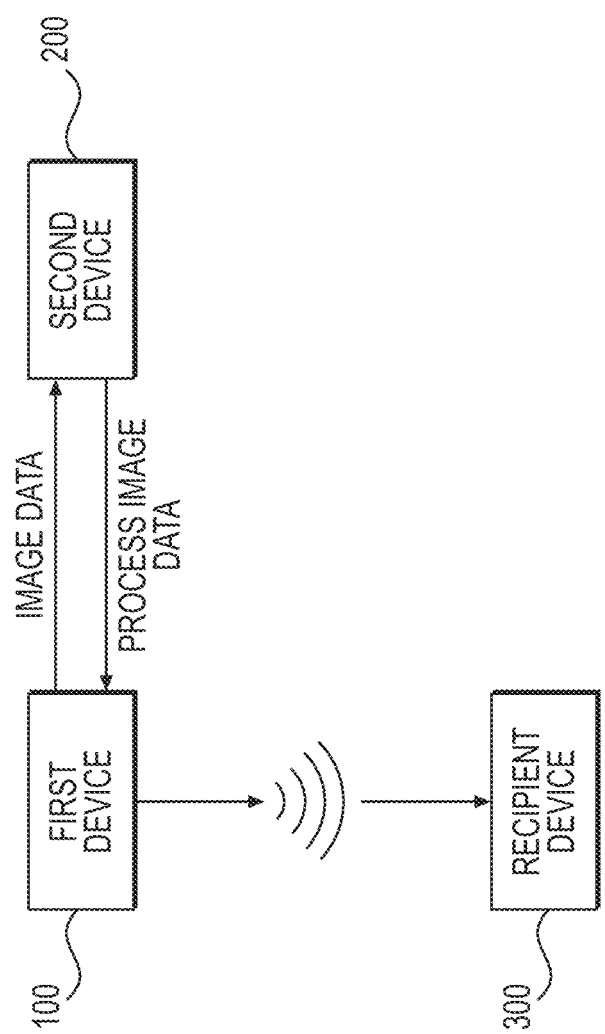
FIG. 12 is a networking diagram according to some embodiments.

FIG. 12 shows a networking diagram of the data streaming system.

The first device 100 may include wireless internet connectivity via either a data connection or a wireless "WiFi" connection. In some embodiments, the first device 100 includes the capability to create a mobile hotspot using its data connection. Other devices, such as second device 200 and other external cameras or external devices described later, may connect to the data connection of the first device 100 using a tethering process by connecting to the mobile hotspot established by the first device 100. In other embodiments, the first device 100 can connect to a wireless network along with the second device 200 and other external devices.

As shown in FIG. 12, the first device 100, with a camera disposed therein, can communicate with the second device 200 via an internet connection established within the first device 100 using the connections described above. The second device 200, which may have its own wireless connection capability, can tether to a wireless network (Hotspot) established by the first device 100, and can receive image data from the camera of the device 100. The second device 200 can then display the image data on its display system 2050 so that the user of the second device 200 may view the image data.

While a wireless connection of second device 200 is described above, a wireless connection of second device 200 is not necessarily required. Second device 200 and first device 100 may alternatively communicate, for example, via wired, RFID, or near-field such as Bluetooth connection, and data may be transmitted between second device 200 and device 100 without the user of a wireless connection. In any event, however, at least one device is contemplated to have a wireless network capability so that the data can ultimately be transmitted via a wireless network for streaming to a recipient device 300. While only one recipient device 300 is shown, it is to be appreciated that plural recipient devices 300, each with respective end-users, can receive the processed image data via the streaming application.

After the image data is sent to the second device 200, a user may then review the image data and determine whether to send the image data to the recipient device 300 belonging to an end-user using a streaming service. In some embodiments, the image data is sent to the end-user automatically, without intervention by the user. In other embodiments, as described in more detail later, the user is able to select between multiple image data coming from the first device 100 and/or other external devices, and choose which image data to transmit to the end-user via streaming. In still other embodiments, multiple image data is automatically or manually sent to the end-user, and the end-user is able to select one or more video streams from a plurality of the image data using an application.

As shown in FIG. 12, the image data received by the second device 200 is then processed by the second device 200 and returned to the first device 100, which will then send the image data to the end-user's recipient device 300 via its data connection. However, in some embodiments where the second device 200 is already connected to a wireless network that is not a Hotspot, the second device 200 may send the image data directly to the end-user's recipient device 300 via the wireless network, thus omitting the return of the image data to the first device 100.

Though the above example describes image data, which may be still image data or moving (video) image data, the data being transmitted may be data other than image data. For example, the data may also be audio data received by, for example, a microphone within the first device 100.

Figure 13:
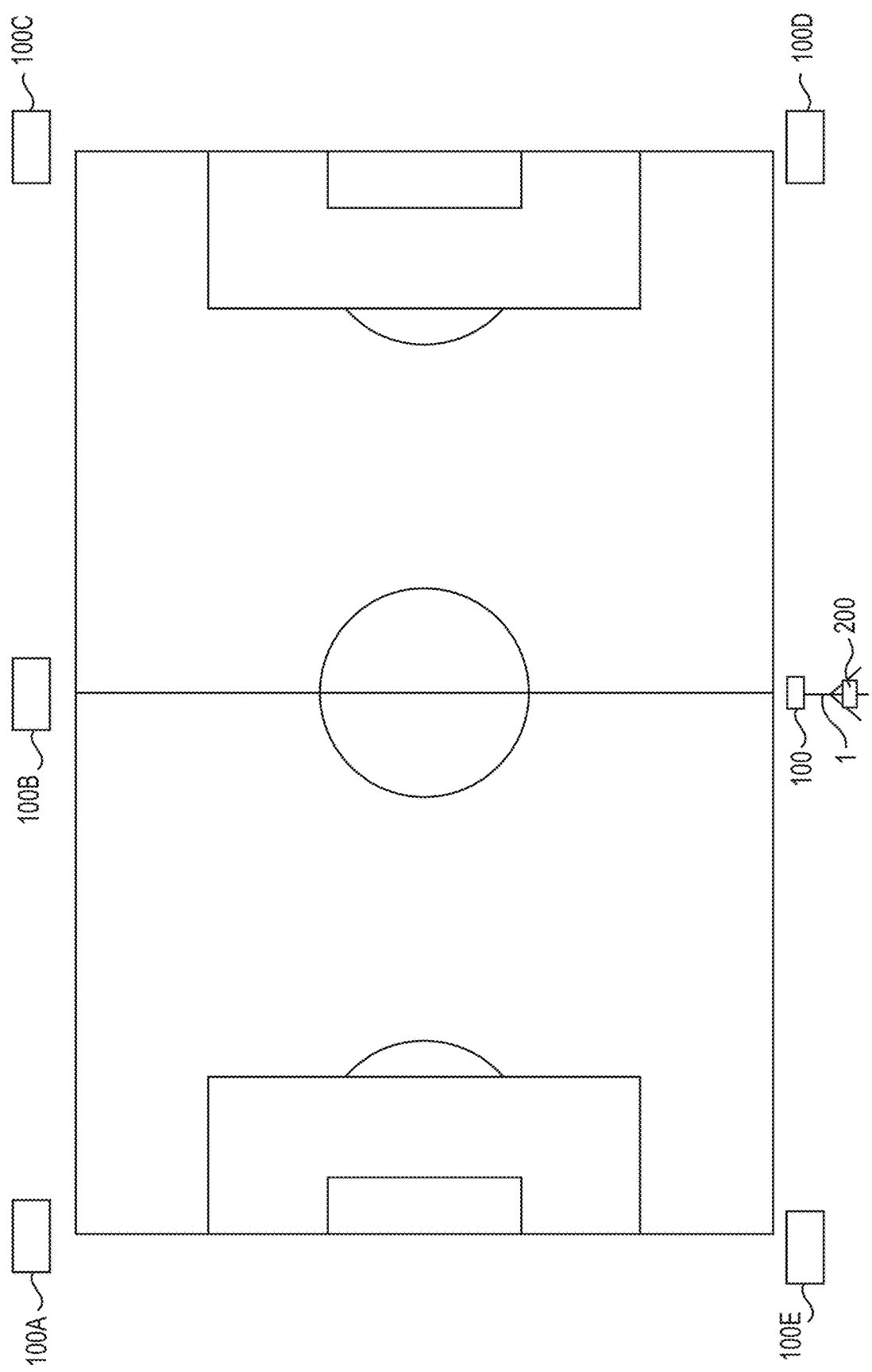
FIG. 13 is a schematic of a plurality of cameras disposed around an event location according to some embodiments.

FIG. 13 shows a configuration of devices disposed around an exemplary event. A soccer game is used as an exemplary event. As shown in FIG. 13, a tripod 1 is set up by a user, with first device 100 and second device 200 disposed therein. Additional camera devices 100A, 100B, 100C, 100D and 100E are set up at various locations around the event. The number of additional camera devices is not limited, and in some embodiments, 9 or more camera devices can be set up around the event.

Each camera device 100A-100E may be provided with its own wireless connection capability and can either connect to the wireless hotspot established by first device 100, or to a wireless network into which devices 100 and 200 are connected to. Further, each camera device may be any viable camera, for example, a camera within a mobile phone, a tablet, or any independent camera device. Each camera may be mounted on a tripod, for example its own tripod having the same configuration as tripod 1 of FIG. 1. However, the cameras might not be mounted to a tripod, and may be set up at various locations such as walls, seats, and user's hands throughout the event. Further, each camera device 100A-100E may have at least one processor similar to the at least processor of first device 100.

In embodiments where the camera devices 100A-100E are present, the camera devices are configured to transmit the image data back to the second device 200 (either directly or via a connection through the Hotspot of device 100) for processing.

Figure 14:
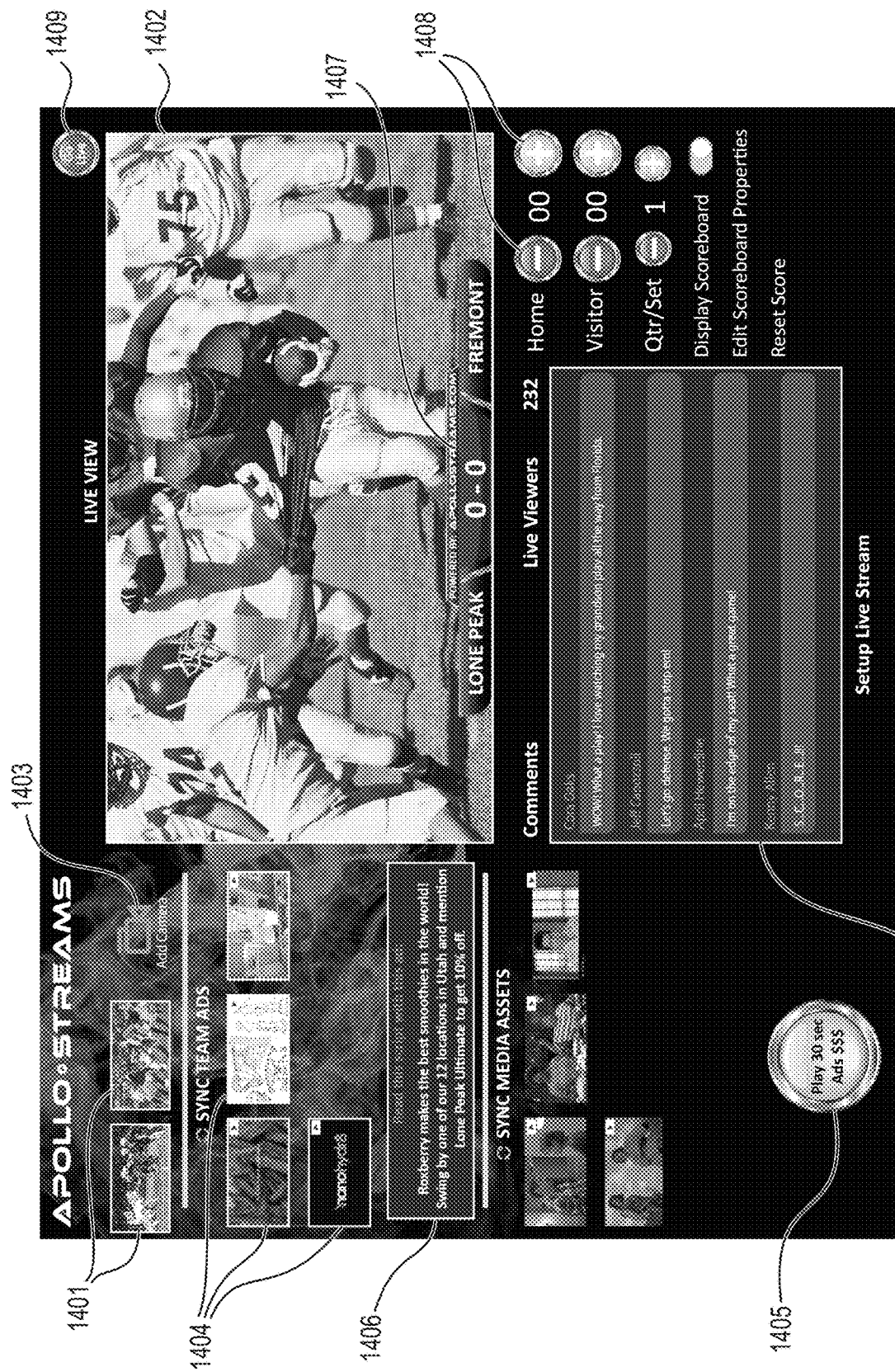
FIG. 14 is an exemplary display screen according to some embodiments.

In such embodiments, the display system including a display screen 2050 of the second device 200 may show images from a plurality of the camera devices including first device 100 and devices 100A-100E. FIG. 14 shows an example of such a display.

FIG. 14 shows an exemplary display screen 2050 to be shown on the device 200. As an example, in the top left corner, image data 1401 from a plurality of the cameras is shown and can be selected to be provided in the main "live view" screen 1402. An "add camera" button 1403 is added for a user to be able to add an additional feed from another of the cameras set up in the event.

The display screen 2050 may include a plurality of advertisements 1404. The advertisements may be stored within an advertisement source, which may be an online server, local advertisements stored within the memory of first device 100, second device 200, or some other external memory. In some embodiments, the ads 1404 are ads provided by the team, and may be shown, either in response to a selection by the user or by random automatic selection, to the end-user using the process described in FIG. 12. In some embodiments, additionally or alternatively, the user of the second device 200 may choose which of a plurality of advertisements to broadcast to the end-user recipient device 300 selecting the "play 30 sec Ads" button 1405 on the display screen 2050. This may trigger a processor of the second device 200 to retrieve advertisements either from an internal memory, external memory, or an internet-based location, and to transmit the advertisements to the end-user recipient device 300. Upon selection of the button 1405, the second device 200 may also be configured to track a number of recipient devices 300 that are online viewing the streaming at the given time, so as to determine a number of end-users receiving the advertisement being displayed. The processor may also be able to determine, based upon a predefined revenue structure, an amount of ad revenue for a particular advertisement, and may be configured to provide payment, via an appropriate application, to an intended recipient of the advertisement revenue. A script 1406 relating to the advertisement, which may also be stored within the online server or a memory, may be written on the display screen 2050 for the user to read while streaming the advertisement.

The main live view screen 1402 may also include a scoreboard 1407 that can be controlled by the user using buttons 1408.

In some embodiments, the user of the second device 200, which is the same user of the tripod device 1 (hereinafter "the user"), can select what information will be transmitted by the streaming to the end-user recipient device 300. In FIG. 14, the display of the live view screen 1402 will be transmitted to the end-user recipient device 300 using the process described in FIG. 12. The image or video shown in the live view screen can be changed by the user of the second device 200 selecting image data 1401 from a different camera, or an advertisement 1404, or by changing the scoreboard display properties with button 1408. Further, the user may pause the live view either to show the advertisements or otherwise, and may use the "go live" button 1409 to return the feed to a live feed of the event. The user may also be able to zoom in and out on particular image data, either by directly controlling the cameras taking the image data, described later, or by simply enlarging or reducing the view on the display 2050 itself.

In some embodiments, the user of the recipient device 300 (hereinafter the "end-user") may be able to comment about the event using end-user recipient device 300, and the comments may be displayed on the end-user recipient device 300 screen, and as comments 1410 on the display screen 2050 of the second device 200.

Further, while in some embodiments the screen of the end-user recipient device 300 only shows a single view corresponding to the live view screen 1402, and optionally the comments 1410, in other embodiments, the end-user receives a feed similar to the display screen 200 and the end user is capable of selecting different camera views on his/her own.

Figure 15:
FIG. 15 is another exemplary display screen according to some embodiments.

FIG. 15 shows a setup for the user of the device 200. The user of the device 200 may choose to stream the image data from the event using a streaming service such as YouTube® or Facebook Live®, or any other compatible streaming device. The user may set a stream quality optimally based upon desired image quality and usable internet bandwidth. The user may choose the uniform resource locator (URL) of the stream and an key or ID for the stream.

Figure 16:
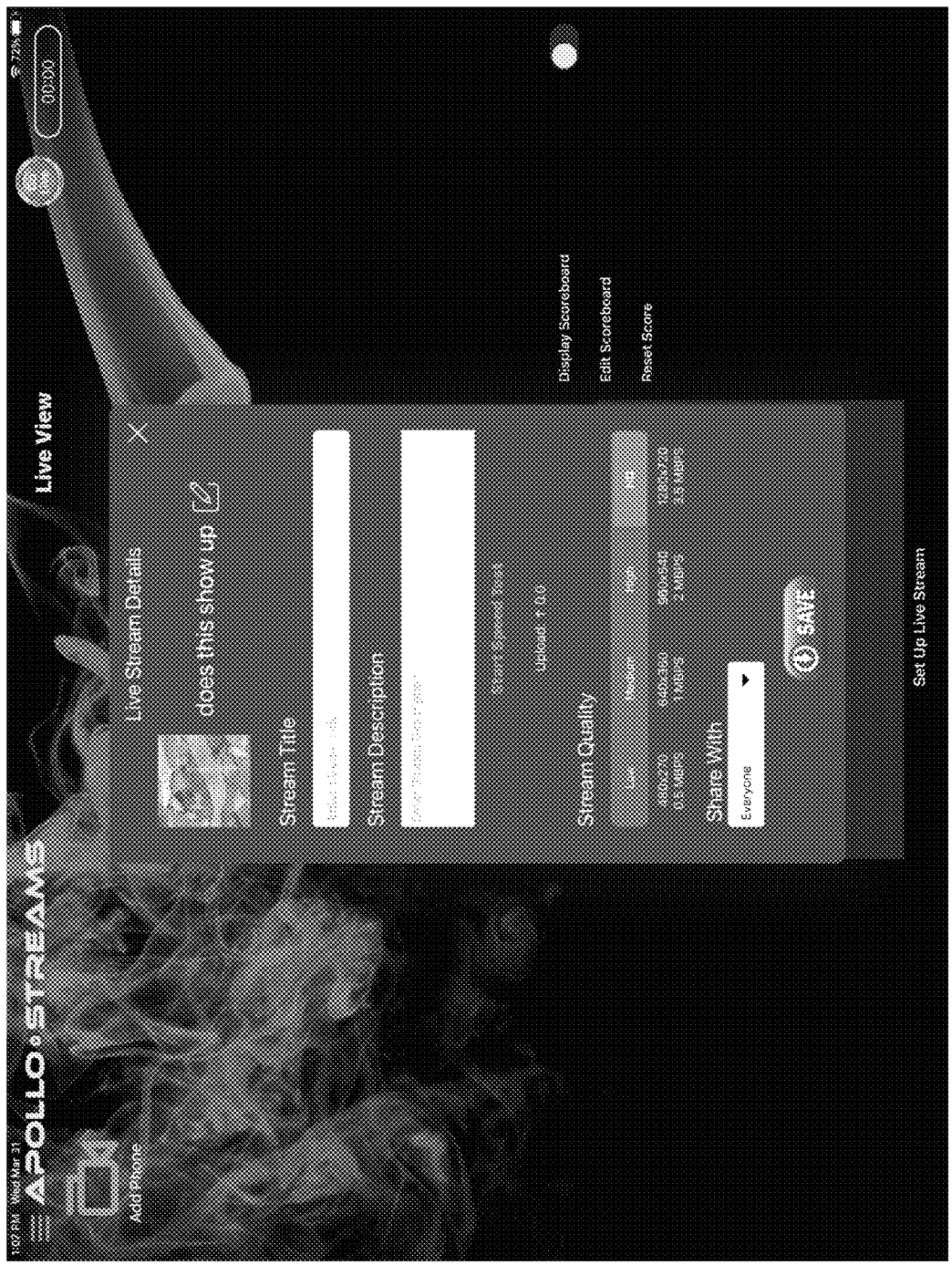
FIG. 16 is another exemplary display screen according to some embodiments.
Figure 17:
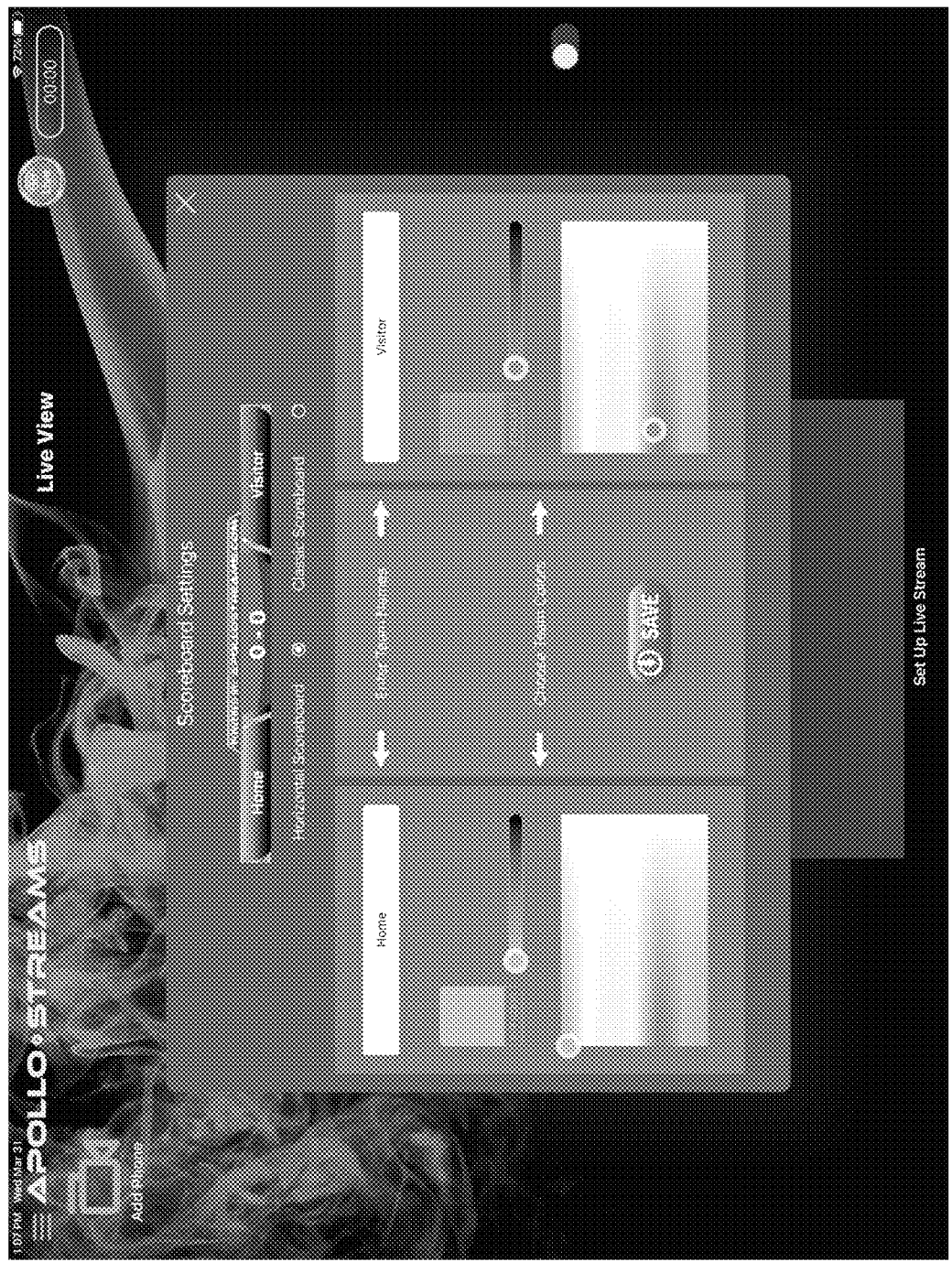
FIG. 17 is another exemplary display screen according to some embodiments.

As shown in FIG. 16, the user may provide a title and/or description of the event to improve recognizability, and may choose with which end-users to share the stream. Further, as shown in FIG. 17, the user may choose team colors and names to be displayed on the scoreboard 4107.

Figure 18:
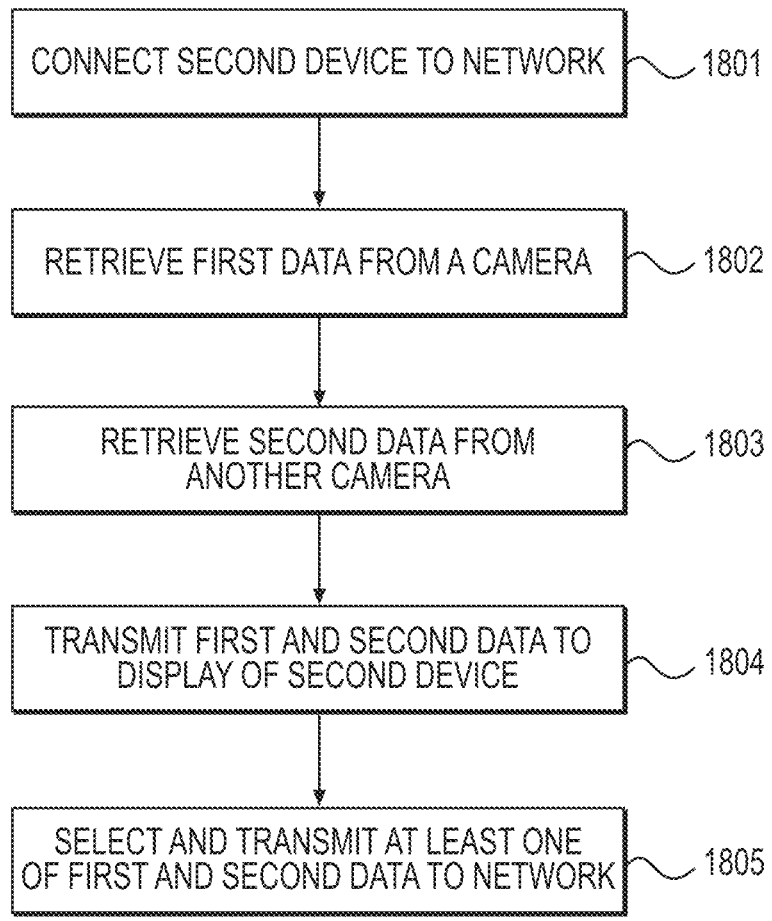
FIG. 18 is a flow chart of a method according to some embodiments.

FIG. 18 describes instructions followed by the processors of device 100, 200, and/or processors of devices 100A-E.

In step 1801, the second device 200 may connect to a wired or wireless network. This may be a wireless network established by a Hotspot of first device 100, or a wireless network to which both devices 100, 200, as well as any other devices 100A-E may connect to, or a wired network. The devices 100 and 100A-E may also connect to the same network.

In step 1802, at least one of the processors of the system will retrieve first data from one of a plurality of cameras at a first predetermined position at the event location. In some embodiments, the first data corresponds to image data that is acquired by a camera of the device 100.

In step 1803, at least one of the processors of the system will retrieve second data from another of the plurality of the cameras disposed at a second predetermined position at the event location. The second predetermined position may be a different position than the first predetermined position. For example, image data taken from processor 100A shown in FIG. 13 may be retrieved.

In step 1804, the first data and the second data will be transmitted to the display of the display device, such as the display system/screen 2050 of second device 200.

In some embodiments, each of steps 1802, 1803 and 1804 are performed by processor 2010 of second device 200. However, other processors, such as those within the respective cameras, may be utilized.

In step 1805, at least one of the first data and the second data will be selected, and transmitted to the wireless network for retrieval by a recipient device. In some examples, the recipient device is the device 300 of the end-user recipient.

In some embodiments, the user of the second device 200 may choose to selectively transmit data beyond the first data and the second data, such as scoreboard information, logo information, color information for the scoreboard, and so forth.

In some embodiments, the user of the second device 200 can selectively choose which of the first data, the second data, or other data generated from another of the devices 100, 100A-100E to send, via the wireless network, to the recipient device 300 of the end-user recipient via streaming. In some embodiments, the one or more processors 2010 may be configured to automatically determine which of the first data, second data, or alternative data to send to the recipient device 300 using predetermined rules.

In some embodiments, the one or more processors are configured to transmit advertisement data to the wireless network for streaming to the device 300. The advertisement data may include or be selected from the plurality of advertisements 1404 described with reference to FIG. 14.

In some embodiments, the one or more processors of the system (e.g., processors 1010, 2010, or others) may be configured to track a number of viewers of the live stream (e.g., a number of end-users respectively using ones of the recipient devices 300) so that data regarding advertisement viewing can be compiled, stored as assessed. For example, monetary reports related to the advertisement data can be determined in view of the viewer tracking and advertisement display. Financial rewards may be calculated based upon the number of live viewers, and the one or more processors have the capability to acquire and disburse financial payment for playing the advertisements.

In some embodiments, multiple configurations may be achieved. The user may be able to control the data to be displayed on the display device 2050 of second device 200, and to be sent via the wireless network to the recipient device 300 using an application. The application may be accessible from the second device 200 once downloaded from a server, and may be available using iOS and Android platforms.

The application may include a remote camera mode which can allow the user of the second device 200 to connect with another camera device (e.g., camera of first device 100, or any device 100A-100E, or any other device) by wireless or wired connection. The wired connection may be, for example, an HDMI cable. In such a mode, the user may be able to remotely control the camera device to which it is connected. The user may, for example, be able to remotely control the camera device to zoom the camera, move the camera along the x, y, or z axis or along a rotational axis, power the camera on and off, and so on. In some embodiments, each remote camera may be mounted on a tripod 1 having a gimbal 1000 similar to that shown in FIG. 9. The user may be able to remotely control the gimbal 1000 using a remote control or other configuration, to thereby move or control the camera in a desired way.

Owing to such a configuration, the user of the second device 200 may be able not only to view multiple camera views at different locations around an event, but may also be able to control such cameras to adjust feeds or image processing characteristics while still being able to stay at the location of the second device 200.

The application may allow for live streaming of both video and audio, thus allowing for real time or nearly real-time provision of data relating to the event via the streaming service. The application may allow for streaming using any known streaming service, including but not limited to Facebook, YouTube, LinkedIn Live, Twitch, and Custom RTMP. The user of the second device 200 may save and send recorded videos within the device memory of the second device 200, and on a cloud platform. Further, end-users of the recipient devices 300 may have the capability of recording and/or saving image data or audio data locally.

The application may also include a capability to provide transition effects such as cut, cross dissolve, wipe, cube and twist. These transitions can be applied by the user of the second device 200 to image data before or during the streaming. Further, the user of the second device 200 may control zoom or stabilization of the image feeds.

The application may also be configured to capture and utilize footage from cameras attached to drones during the event. The drones may be able to communicate with the second device 200 via wireless or near-field connection.

The application may further have an instant replay option where the one or more processors of the second device 200 may be able to capture image data corresponding to the last seconds, for example, 5, 10 or 15 seconds, of a play, store it in a memory, and edit the play by moving it into slow motion and zoom appropriately. The user of the second device 200 may then selected to provide an instant replay to the wireless network to be viewed by the end-user of the recipient device 300. The image data may be continually deleted and replaced in the memory every 30 seconds, 1 minute, 5 minutes, or at some other predetermined time period, so as to reduce the amount of necessary data storage, improve processing efficiency and reduce cost.

In some embodiments, cameras may be trained to follow a ball or other item being used during the event, and can send image data to the second device 200 automatically.

Figure 19:
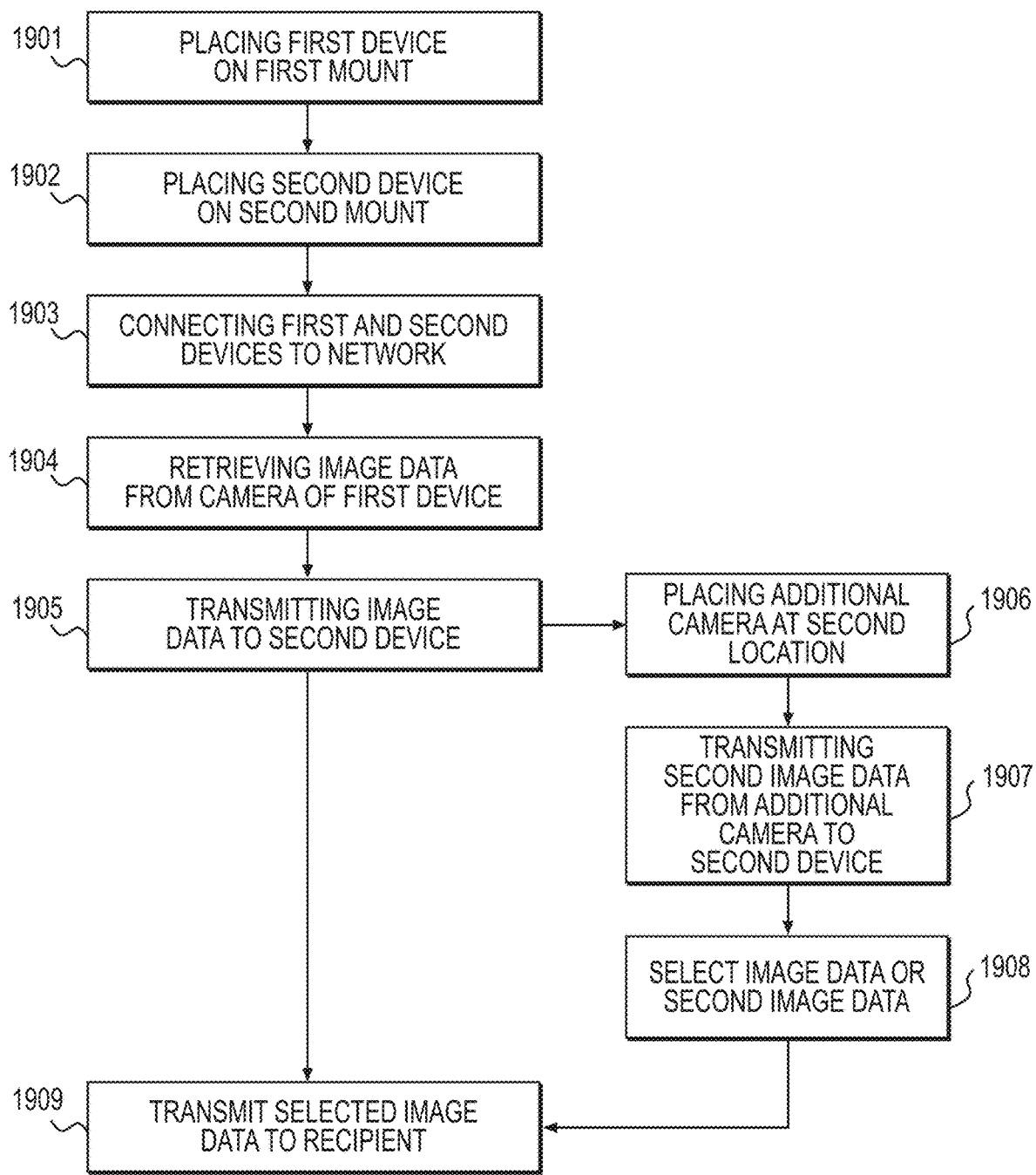
FIG. 19 is a flow chart of a method according to some embodiments.

As shown in FIG. 19, another aspect of the disclosure includes a method of transmitting data from an event. The method includes a step 1901 of placing a first device, such as device 100, on a first mount, such as mount 60, disposed on a tripod device. The method further includes a step 1902 of placing a second device, such as device 200, on a second mount such as mount 80 disposed on a plurality of legs, for example legs 10A and 10C, of the tripod device. The second device may be placed at a position below the first device.

Further provided is a step 1903 of connecting the first device and the second device to a network. The network may be a wireless or a wired network, or a combination of wireless and wired networking. A step 1904 of retrieving the image data from a camera of the first device is also provided.

Additionally, a step 1905 of transmitting the image data from the camera of the first device to the second device is provided. Optionally, a step 1906 of placing an additional camera at a second, separate location is provided, and a step 1907 of transmitting second image data from the additional camera to the second device is provided. In such a configuration, a step 1908 of selecting at least one of the first and second image data to be transmitted to a recipient device (such as device 300) may be provided. In step 1909, the appropriate image data is transmitted to the recipient device.

In embodiments where only one camera (the camera of the first device) is used, step 1909 may succeed step 1905, with steps 1906-1908 omitted. Further, it is envisaged that each of the steps described above may be performed in a temporal order as shown in FIG. 19, but the steps may also be performed in another order. For example, the additional camera in step 1906 may be placed before, immediately after, or concurrently with steps 1901 and 1902.

In some embodiments, as described previously, the second device 200 may be connected to an advertisement source, and advertisements may be selectively transmitted, either by an action of the user of the second device 200 or by some automated programming, to the recipient device 300.

Owing to the embodiments described above, a single user (e.g., the user of the device 200) may be advantageously able to set up a system involving an easy setup of cameras, with or without respective tripods, and all cameras can be connected to the second device 200 which simultaneously receives image data from each camera. Then, the user can manually select one or more of the image data to be sent to the recipient device 300 using a streaming platform via a wireless network, or one or more of the image data may be automatically sent to the recipient device. In any event, a single person, the user of the second device 200, can control image data to be streamed from multiple cameras using only a single processing device, the second device 200. Thus, the user may be comfortably sitting alongside the second device 200, optionally also controlling the camera of device 100 using the tripod 1, while obtaining the benefits and ability to stream image data from remote cameras set up at different areas around the event. Such a configuration may be particularly advantageous in, for example, smaller sporting events such as youth sporting events or events with a lower budget or less manpower, while still providing multiple, professional quality images to the end-user using the streaming service.

Further, the ability to retrieve, select, and play advertisements to the end-user during the streaming may be particularly advantageous to monetize events that otherwise have limited ability for monetization.

Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the presently described embodiments. The following claims are in no way intended to limit the scope of embodiments to the specific embodiments described herein.

What is claimed is:
1. A camera mounting system, comprising:
  a tripod, comprising:
    a base portion;
    an extendible and collapsible plurality of legs configured to extend downward from the base portion;
    an extendible and collapsible neck configured to extend upward from the base portion;
    a ball joint connected to the extendible and collapsible neck;
    a first mount connected to the ball joint and configured to hold a first device;

a second mount anchored to at least two of the plurality of legs and configured to hold a second device different from the first device; and a handle connected to a connector portion at a lower portion of the extendible and collapsible neck, the handle configured to move along first and second axes and to rotate along a 360° plane, wherein the expandable and collapsible neck is configured to move in response to a movement of the handle in each of a left direction, a right direction, a front direction and a back direction, and is also configured to move in an up direction and a down direction, and wherein the tripod further comprises a first rotatable knob connected to the connector portion and configured to control movement of the handle in the left direction and the right direction, and a second rotatable knob also connected to the connector portion and disposed above the first knob, and configured to control movement of the handle in the forward direction and the backward direction, and wherein the connector portion includes a channel within which a lower portion of the neck is provided.

2. The camera mounting system according to claim 1, wherein the tripod has a height of about 7 to about 9 feet when in an extended configuration.

3. The camera mounting system according to claim 1, further comprising a first shield connected to the first mount, the shield having a left flap, a right flap and an upper flap and configured to cover the first device when held in the first mount.

4. The camera mounting system according to claim 1, further comprising a second shield connected to the second mount, the shield having a left flap, a right flap and an upper flap and configured to cover the second device when held in the second mount.

5. The camera mounting system according to claim 1, further comprising a gimbal connected to the first mount and configured to enable the first device to rotate along a rotation axis.

6. The camera mounting system according to claim 1, wherein the system further comprises the first device and the second device, the second device having a processor configured to:

connect to a network;

retrieve first data from a camera of the first device, the first device disposed at a first predetermined position at an event location, the camera being connected to the network;

display the first data;

transmit the first data to the network.

7. The camera mounting system according to claim 6, wherein the second device is configured to control at least one of movement, zoom and powering of the first device via wireless or wired communication.

8. The camera mounting system according to claim 6, wherein the second device is held by the second mount, the first device is held by the first mount, and the second device has a screen configured to display image data of an image acquired by the first device.

9. The camera mounting system according to claim 6, wherein the system further includes an additional camera disposed at a second predetermined position at the event location, the camera being connected to the network, and wherein the processor is further configured to:

retrieve second data from the additional camera;

select at least one of the first data and the second data and transmit the at least one of the first data and the second data to the network for retrieval by a recipient device.

10. The camera mounting system according to claim 9, wherein the at least one of the first data and the second data is transmitted from the second device to the first device via the network, and thereafter transmitted to the internet for retrieval by the recipient device.

11. The camera mounting system according to claim 9, further comprising a plurality of additional cameras each disposed at distinct predetermined positions around the event location.

12. The camera mounting system according to claim 11, wherein the processor is configured to retrieve image data from each of the plurality of additional cameras and to display the image data on a display screen of the second device.

13. The camera mounting system according to claim 11, wherein the processor is configured to select, in response to a user command, the first data, the second data, or the image data of one of the plurality of the cameras, and to transmit the selected data to the network.

* * * * *